United States Patent
Jain et al.

(10) Patent No.: US 11,212,240 B2
(45) Date of Patent: Dec. 28, 2021

(54) EFFICIENT CONVERGENCE IN NETWORK EVENTS

(71) Applicant: AVAGO TECHNOLOGIES INTERNATIONAL SALES PTE. LIMITED, Singapore (SG)

(72) Inventors: Rajesh Pukhraj Jain, Irvine, CA (US); Eswara S. P. Chinthalapati, Irvine, CA (US); Sandeep G. Bhat, Irvine, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 316 days.

(21) Appl. No.: 16/304,683

(22) PCT Filed: Apr. 27, 2017

(86) PCT No.: PCT/US2017/029816
§ 371 (c)(1),
(2) Date: Nov. 26, 2018

(87) PCT Pub. No.: WO2017/204983
PCT Pub. Date: Nov. 30, 2017

(65) Prior Publication Data
US 2020/0328988 A1 Oct. 15, 2020

Related U.S. Application Data

(60) Provisional application No. 62/343,559, filed on May 31, 2016, provisional application No. 62/341,945, filed on May 26, 2016.

(51) Int. Cl.
*H04L 12/931* (2013.01)
*H04L 12/751* (2013.01)
(Continued)

(52) U.S. Cl.
CPC .............. *H04L 49/65* (2013.01); *H04L 45/02* (2013.01); *H04L 45/54* (2013.01); *H04L 45/64* (2013.01);
(Continued)

(58) Field of Classification Search
CPC ......... H04L 49/65; H04L 45/02; H04L 45/54; H04L 45/64; H04L 45/66; H04L 49/354;
(Continued)

(56) References Cited

U.S. PATENT DOCUMENTS 9,491,107 B1 * 11/2016 Scudder .................. H04L 45/16
2008/0205402 A1 8/2008 McGee et al.
(Continued)

OTHER PUBLICATIONS

Preliminary Report dated Dec. 6, 2018 in International Application PCT/US2017/029816 including Written Opinion dated Aug. 6, 2017.

*Primary Examiner* — Charles C Jiang
*Assistant Examiner* — Shawn D Miller
(74) *Attorney, Agent, or Firm* — Morgan, Lewis & Bockius LLP

(57) ABSTRACT

One embodiment of the present invention provides a switch. The switch includes a storage device, one or more line cards, and a control card. A respective line card includes one or more ports and forwarding hardware. The control card determines routing and forwarding tables for the switch, and comprises processing circuitry and a management module. The management module manage a tunnel or virtual network at the switch. During operation, the control card determine an event associated with layer-2 operations of the switch. The control card refrains from notifying the management module regarding the event and notifies a first line card in the one or more line cards regarding the event. The first line card then updates a layer-3 forwarding entry in the
(Continued)

corresponding forwarding hardware based on the notification.

21 Claims, 14 Drawing Sheets

(51) Int. Cl.
*H04L 12/741* (2013.01)
*H04L 12/715* (2013.01)
*H04L 12/721* (2013.01)
*H04L 29/12* (2006.01)

(52) U.S. Cl.
CPC ............ *H04L 45/66* (2013.01); *H04L 49/354* (2013.01); *H04L 61/103* (2013.01)

(58) Field of Classification Search
CPC ... H04L 61/103; H04L 12/4633; H04L 29/00; H04L 12/46
See application file for complete search history.

(56) References Cited

U.S. PATENT DOCUMENTS

| | | |
|---|---|---|
| 2011/0225207 A1* | 9/2011 | Subramanian ........ H04L 45/745 707/803 |
| 2011/0243136 A1 | 10/2011 | Raman et al. |
| 2015/0010001 A1 | 1/2015 | Duda et al. |
| 2015/0200847 A1* | 7/2015 | Gourlay .................. H04L 47/80 370/392 |
| 2015/0244617 A1 | 8/2015 | Nakil et al. |
| 2015/0381494 A1 | 12/2015 | Cherian et al. |
| 2016/0269324 A1* | 9/2016 | Banavalikar ...... H01L 27/11556 |

\* cited by examiner

EFFICIENT CONVERGENCE IN NETWORK EVENTS

BACKGROUND

Field

The present disclosure relates to communication networks. More specifically, the present disclosure relates to a system and a method for facilitating efficient convergence to a switch in a network event.

Related Art

The exponential growth of the internet has made it a popular delivery medium for a variety of applications running on physical and virtual devices. Such applications have brought with them an increasing demand for bandwidth. As a result, equipment vendors race to build larger and faster switches with versatile capabilities, such as efficient management of control messages of a switch. However, the capabilities of a switch cannot grow infinitely. Those capabilities are limited by physical space, power consumption, and design complexity, to name a few factors. Furthermore, switches with higher capabilities are usually more complex and expensive. As a result, increasing efficiency in existing capabilities of a switch adds significant value proposition.

To meet with increasing traffic demand, a switch can support overlay tunnels. In an overlay network that facilitates a virtualized layer-2 network, a layer-2 network is extended across a layer-3 network using the overlay tunnels. Typically, when the switch forwards a packet via the tunnel, an outer layer-2 header is added to the tunnel encapsulation header. The switch then forwards the encapsulated packet to the next-hop switch based on the outer layer-2 header. However, a layer-2 event (e.g., a media access control (MAC) address movement or a failover) can trigger a change in how the switch forwards the tunnel-encapsulated packet to the next hop. For example, the layer-2 event can affect the next-hop entry for the tunnel. For a large number of tunnels, such a layer-2 event can trigger a large number of changes.

While the overlay tunnels bring many desirable features in a switch, some issues remain unsolved in facilitating efficient management of the changes associated with a layer-2 event.

SUMMARY

One embodiment of the present invention provides a switch. The switch includes a storage device, one or more line cards, and a control card. A respective line card includes one or more ports and forwarding hardware. The control card determines routing and forwarding tables for the switch, and comprises processing circuitry and a management module. The management module manage a tunnel or virtual network at the switch. During operation, the control card determine an event associated with layer-2 operations of the switch. The control card refrains from notifying the management module regarding the event and notifies a first line card in the one or more line cards regarding the event. The first line card then updates a layer-3 forwarding entry in the corresponding forwarding hardware based on the notification.

In a variation on this embodiment, the control card determines the event by determining an unavailability of a first port of the switch, obtaining an Address Resolution Protocol (ARP) response via a second port of the switch, and associating the second port with a mapping between an Internet Protocol (IP) address and a media access control (MAC) address obtained from the ARP response.

In a variation on this embodiment, the layer-3 forwarding entry is associated with a layer-3 next-hop switch for a remote tunnel endpoint of a tunnel affected by the event.

In a further variation, the layer-3 forwarding entry corresponds to an outer layer-2 header associated with the layer-3 next-hop switch.

In a variation on this embodiment, the control card also includes a multi-destination module, which registers to receive information of the event and updates a second layer-3 forwarding entry for multi-destination traffic in the forwarding hardware of the first line card.

In a further variation, the multi-destination module maintains a list of tunnels and virtual networks of the switch. The list indicates a mapping between a tunnel or virtual network to a corresponding line card.

In a further variation, the multi-destination module identifies a tunnel or virtual network, which is associated with the first line card and affected by the event, from the list. Here, the second layer-3 forwarding entry corresponds to the identified tunnel or virtual network.

One embodiment of the present invention provides a switch. The switch includes a storage device, one or more line cards, and a control card. A respective line card includes one or more ports and forwarding hardware. The control card determines routing and forwarding tables for the switch, and comprises processing circuitry, a management module, and a multi-destination module. The management module manages one or more tunnels or virtual networks at the switch. The multi-destination module configures layer-3 forwarding entries for multi-destination traffic in the forwarding hardware of the one or more line cards. During operation, the management module determines an event associated with layer-3 operations of the switch and sends a probe message to the multi-destination module to determine whether the multi-destination module is available. If the management module receives a probe response message from the multi-destination module, the management module sends, to the multi-destination module, a notification message comprising information associated with a first tunnel or virtual network affected by the event.

In a variation on this embodiment, if the management module does not receive a probe response message within a period of time, the management module determines a state for the first tunnel or virtual network. The state indicates that an update in a forwarding entry is needed for the first tunnel or virtual network.

In a further variation, if the management module receives the probe response message, the management module identifies the state for the first tunnel or virtual network and inserts information associated with the first tunnel or virtual network into a buffer.

In a further variation, if the buffer reaches a threshold, the management module includes the information of the buffer in the notification message.

In a variation on this embodiment, the management module maintains a list of the one or more tunnels or virtual networks managed by the management module. The list includes an entry for the first tunnel or virtual network.

In a variation on this embodiment, if the management module detects an unsuccessful transmission of the notification message, the management module sends a second probe message to the multi-destination module to determine whether the multi-destination module is available.

In a variation on this embodiment, whether the multi-destination module is available is determined based on a global state maintained for the multi-destination module. The global state is accessible by the management module and a second module of the control card.

BRIEF DESCRIPTION OF THE FIGURES

In the figures, like reference numerals refer to the same figure elements.

DETAILED DESCRIPTION

Figure 1A:
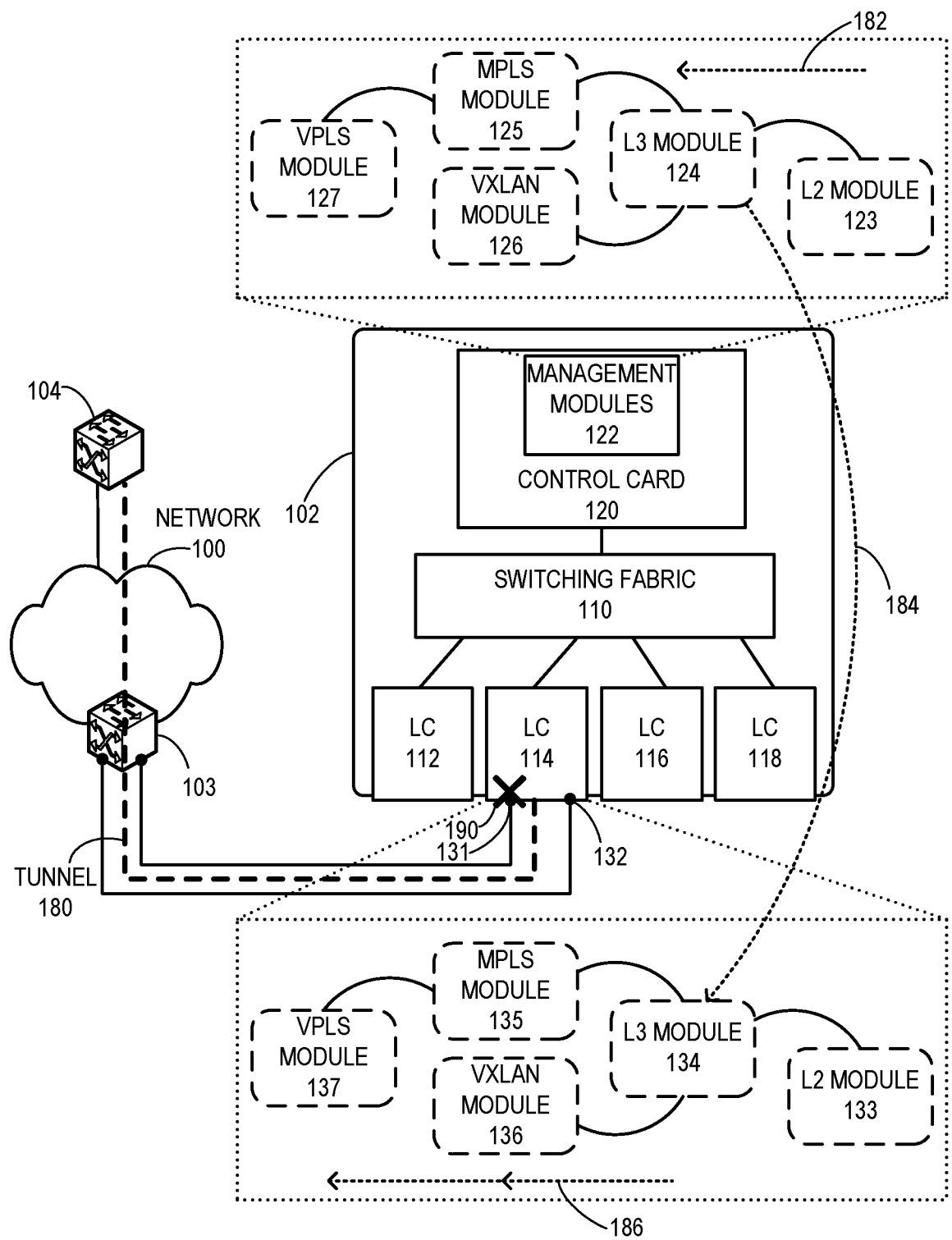
FIG. 1A illustrates an exemplary switch facilitating fast convergence in a layer-2 event, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently managing control messages associated with a respective overlay tunnel instance in a layer-2 event is solved by (i) propagating a control instruction between respective layer-3 modules of a control card and a line card; (ii) propagating a control instruction between a layer-3 module and a multi-destination traffic module of a control card; and (iii) facilitating intelligent buffering and adaptive synchronization with a multi-destination traffic module.

A control card of a switch is a switch card, which can also be part of a back plane, of a switch that controls the switch. The control card implements routing protocols and establishes routes. A layer-3 module of the control card is responsible for managing forwarding information associated with a respective layer-3 forwarding entry. On the other hand, a layer-3 module of a line card of the switch is responsible for incorporating the managing forwarding information associated with a respective layer-3 forwarding entry into the forwarding hardware (e.g., in ternary content-addressable memory (TCAM)) of the line card. The multi-destination traffic module of the control card is responsible for managing the forwarding information associated with multi-destination traffic for overlay tunnels in a respective line card.

Typically, a tunnel instance is established between two tunnel endpoints. A tunnel endpoint can be a switch (or any computing device) capable of originating or terminating a tunnel encapsulation header. To forward a packet via the tunnel, the tunnel endpoint encapsulates the packet with an encapsulation header associated with a corresponding tunneling protocol (e.g., a layer-3 encapsulation header over an inner layer-2 header). The source and destination addresses in the encapsulation header correspond to the tunnel endpoints of the tunnel. In addition, to forward the encapsulated packet to the next-hop corresponding to the destination address, an outer layer-2 header is added to the encapsulation header. This outer layer-2 header is determined based on the forwarding information associated with the tunnel instance.

Examples of a tunneling protocol include, but are not limited to, virtual extensible LAN (VXLAN), generic routing encapsulation (GRE), network virtualization using GRE (NVGRE), layer-2 tunneling protocol (L2TP), and multi-protocol label switching (MPLS). Different virtual local area networks (VLANs) are mapped to different corresponding virtual network identifiers for a tunnel. A tunnel endpoint can include the virtual network identifier in the encapsulation header associated with the tunnel. For example, if the tunneling protocol is VXLAN, the tunnel endpoint can be a virtual tunnel endpoint (VTEP), which maps a VXLAN network identifier (VNI) to a corresponding VLAN. In some embodiments, the tunnel endpoint is in a distributed tunnel endpoint, which includes a plurality of tunnel endpoints operating based on virtual router redundancy protocol (VRRP).

A switch can support a large number of tunnel instances (e.g., a large number of VXLAN tunnel instances). As a result, a layer-2 event can affect the layer-2 forwarding information associated with these tunnel instances, leading to a large number of changes to the forwarding information. Furthermore, each tunnel can support a large number of virtual networks (e.g., Virtual Private LAN Service (VPLS)). A tunnel instance or a virtual network instance in a switch can be referred to as a communication instance of the switch. With existing technologies, a layer-2 module of the control card of the switch detects the layer-2 event and notifies the layer-3 module of the control card. The layer-3 module then issues an Address Resolution Protocol (ARP) request for the Internet Protocol (IP) address of the next-hop layer-3 switch and obtains the corresponding media access control (MAC) address. The layer-3 module determines the port from which the layer-2 module has learned the MAC address and notifies a respective tunnel and/or virtual network instances regarding the information associated with the layer-2 event.

Each instance of a tunnel and/or a virtual network, in turn, can generate a control message associated with the changes in the corresponding layer-2 forwarding information (e.g., a new forwarding port for the next-hop layer-3 switch). The instance then sends the control message to the corresponding instance of a line card for updating the forwarding hardware of the line card. As a result, a large number of control messages are generated and propagated within the switch. This can cause a longer convergence time for both unicast and multi-destination traffic in the switch. Multi-destination traffic typically includes broadcast, unknown unicast, and multicast (BUM) traffic.

To solve this problem, embodiments of the present invention facilitate efficient management of the control messages. Instead of notifying each instance of a tunnel and/or a virtual network, the layer-3 module of the control card of the switch generates a control message for the layer-3 module of a respective line card. The layer-3 module of the line card then notifies a respective tunnel and/or virtual network instances to update the hardware of the line card with the updated forwarding information. In addition, instead of each instance of a tunnel and/or a virtual network notifying the multi-destination traffic module to update the corresponding forwarding entry in the hardware of a respective line card, the multi-destination traffic module receives a notification message from the layer-3 module, and updates the forwarding entries for a respective tunnel/virtual network instance for multi-destination traffic. In this way, the control card reduces the notifications across the control card as well as the control messages within the switch.

One or more tunnel/virtual network instances may send a control instruction to the multi-destination traffic module of the control card of a switch. For example, the layer-3 module of a switch may detect an event associated with one or more tunnels. Examples of such an event include, but are not limited to, a configuration event, an operational event, a tunnel activation/deactivation event, a layer-3 next-hop change, an IP address change, and a tunnel key change. As a result, the tunnels and the virtual networks operating on the tunnels may require reconfiguration. The corresponding tunnel/virtual network instances may send control messages to the multi-destination traffic module. With existing technologies, the multi-destination traffic module can be in an occupied state executing some of these instructions when the later instructions arrive. As a result, the multi-destination traffic module may not be able to receive the later instructions (e.g., due to an unsuccessful communication). This leads to repeated resending of these instructions, which causes additional processing in the switch and delay in convergence.

To solve this problem, embodiments of the present invention allow a corresponding tunnel/virtual network module (e.g., the VXLAN module or the MPLS module) to maintain a local state for a respective tunnel/virtual network. The state can indicate whether the event has affected the tunnel/virtual network. The modules also maintain a global state indicating whether the multi-destination traffic module is available (e.g., whether the multi-destination traffic module can spare processing capacity). A tunnel module, which manages one or more tunnels affected by the event, periodically sends a probe message to determine the availability of the multi-destination traffic module. If the multi-destination traffic module sends a response message, the tunnel module checks the local states of a respective tunnel and generates a control instruction for a respective affected tunnel based on the local states. The tunnel module then stores these control instructions in a buffer. If the buffer reaches a size (e.g., reaches a preconfigured length), or a timer of the buffer expires, the tunnel module includes the control instructions in a control message and sends the control message to the multi-destination traffic module. In this way, the tunnel module sends control instructions when the multi-destination traffic module is available.

In some embodiments, the switch can be a member switch of a network of interconnected switches (e.g., a fabric switch). In a fabric switch, any number of switches coupled in an arbitrary topology can be controlled as a single logical switch. The fabric switch can be an Ethernet fabric switch or a virtual cluster switch (VCS), which can operate as a single Ethernet switch. In some embodiments, a respective switch in the fabric switch is an Internet Protocol (IP) routing-capable switch (e.g., an IP router). In some further embodiments, a respective switch in the fabric switch is a Transparent Interconnection of Lots of Links (TRILL) routing bridge (RBridge).

It should be noted that a fabric switch is not the same as conventional switch stacking. In switch stacking, multiple switches are interconnected at a common location (often within the same rack), based on a particular topology, and manually configured in a particular way. These stacked switches typically share a common address, such as an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary physical topology, and does not require extensive manual configuration. The switches can reside in the same location, or be distributed over different locations.

These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can be represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identify the switch as a member switch of the fabric switch.

In this disclosure, the term "fabric switch" refers to a number of interconnected physical switches which can form a single, scalable network of switches. The member switches of the fabric switch can operate as individual switches. The member switches of the fabric switch can also operate as a single logical switch for provisioning, controlling, and/or data forwarding. "Fabric switch" should not be interpreted as limiting embodiments of the present invention to a plurality of switches operating as a single, logical switch. In this disclosure, the terms "fabric switch" and "fabric" are used interchangeably.

Although the instant disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end host" can refer to any device external to a network (e.g., does not perform forwarding in that network). Examples of an end host include, but are not limited to, a physical or virtual machine, a conventional layer-2 switch, a layer-3 router, or any other type of network device. Additionally, an end host can be coupled to other switches or hosts further away from a layer-2 or layer-3 network. An end host can also be an aggregation point for a number of network devices to enter the network. An end host hosting one or more virtual machines can be referred to as a host machine. In this disclosure, the terms "end host" and "host machine" are used interchangeably.

The term "VLAN" is used in a generic sense, and can refer to any virtualized network. Any virtualized network comprising a segment of physical networking devices, software network resources, and network functionality can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. A link between inter-switch ports is referred to as an "inter-switch link." The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, an RBridge identifier, or a combination thereof. In this disclosure, "switch identifier" is used as a generic term, is not limited to any bit format, and can refer to any format that can identify a switch.

The term "tunnel" refers to a data communication where one or more networking protocols are encapsulated using another networking protocol (typically, a lower-layer header is encapsulated with an upper-layer header). Although the instant disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Fast Convergence of Unicast Traffic

FIG. 1A illustrates an exemplary switch facilitating fast convergence in a layer-2 event, in accordance with an embodiment of the present invention. In this example, switches 102 and 104 are coupled to a network 100. Network 100 can be a local area network (LAN), a wide area network (WAN), or a data center network (DCN). If network 100 is a DCN, switch 102 and/or switch 104 can be top-of-the-rack switches. Switch 102 can include a plurality of hot-swappable cards. A hot-swappable card can be added to or removed from switch 102 while switch 102 remains operational. The plurality of switch cards of switch 102 can include one or more line cards and switch fabric cards.

Here, switch 102 includes a plurality of line cards 112, 114, 116, and 118. A respective line card can include one or more ports (or interfaces) that allow links to connect to switch 102. For example, ports 131 and 132 of switch 102 couple switch 102 to network 100 and are in line card 114. Switch 102 can also include one or more switch fabric cards (e.g., Peripheral Component Interconnect Express (PCIe) cards). These switch fabric cards facilitate switching fabric 110 of switch 102. Switching fabric 110 allows internal switching of switch 102 (i.e., switching of packets within switch 102, such as between line cards 112 and 114). In some embodiments, a respective switch fabric card is coupled to a respective line card. As a result, a packet from a line card can be switched to any other line card by any of the switch fabric cards.

During operation, switch 102 and 104 establish and maintain a tunnel 180 between them. Tunnel 180 can be considered a tunnel instance at switch 102. To forward a packet via tunnel 180, switch 102 encapsulates the packet with an encapsulation header associated with a corresponding tunneling protocol. The encapsulation header can be a layer-3 header encapsulating the inner layer-2 header of the packet. The source and destination addresses (e.g., the IP addresses) in the encapsulation header correspond to switches 102 and 104, respectively. In addition, to forward the encapsulated packet to the next-hop switch leading to switch 104, such as switch 103 in network 100, switch 102 adds an outer layer-2 header to the encapsulation header. This outer layer-2 header is determined based on the forwarding information associated with the tunnel instance of tunnel 180. The source and destination addresses (e.g., the MAC addresses) in the outer layer-2 header correspond to switches 102 and 103, respectively.

In some embodiments, switch 102 can include a control card 120, which can also be part of a back plane of switch 102 or can be inserted into switch 102, that controls switch 102. Control card 120 implements routing protocols and establishes routes with other switches from switch 102. Control card 120 includes a set of management modules 122, which comprises a layer-2 module 123 and a layer-3 module 124. Layer-2 module 123 manages the layer-2 operations of switch 102 (e.g., maintaining and updating layer-2 forwarding information). Layer-3 module 124 is responsible for managing forwarding information associated with a respective layer-3 forwarding entry. For example, the next-hop forwarding information associated with tunnel 180 is maintained by layer-3 module 124.

Management modules 122 can also include one or more tunnel modules that are associated with a corresponding tunneling protocol. For example, management modules 122 can include multiprotocol label switching (MPLS) module 125 and Virtual Extensible Local Area Network (VXLAN) module 126. If tunnel 180 is based on MPLS, the tunnel instance of tunnel 180 can be managed by MPLS module 125. MPLS module 125 maintains a list of MPLS tunnel instances in switch 102 and manages information associated with the encapsulation header associated with a respective MPLS tunnel instance. This list may include information associated with an encapsulation header for a respective MPLS tunnel instance. On the other hand, if tunnel 180 is based on VXLAN, the tunnel instance of tunnel 180 can be managed by VXLAN module 126. VXLAN module 126 also maintains a list of VXLAN tunnel instances in switch 102 and manages information associated with the encapsulation header associated with a respective VXLAN tunnel instance.

Information associated with an encapsulation header can include source and destination addresses of the encapsulation header and the outer layer-2 header. In addition, one or more virtual network instances, such as VPLS instances, can operate on tunnel 180. Management modules 122 then further includes a VPLS module 127. The VPLS instances can be managed by VPLS module 127. VPLS module 127 maintains a list of VPLS instances in switch 102 and manages information associated with the encapsulation header associated with the corresponding VPLS instance. In this way, a respective tunnel/virtual network module maintains a list of corresponding tunnel/virtual network instances and their encapsulation information. A tunnel instance or a virtual network instance in switch 102 can be referred to as a communication instance of switch 102.

On the other hand, a respective line card includes the corresponding modules of management modules 122. For example, line card 114 includes a layer-2 module 133, a layer-3 module 134, an MPLS module 135, a VXLAN module 136, and a VPLS module 137. Layer-2 module 133 is responsible for incorporating the layer-2 forwarding information (e.g., based on MAC address learning) into the forwarding hardware (e.g., in TCAM) of line card 114. Similarly, layer-3 module 134 is responsible for incorporating layer-3 forwarding information into the forwarding hardware of line card 114.

Switch 102 can support a large number of tunnel and virtual network instances. Suppose that switch 102 detects a layer-2 event 190 associated with switch 102 (denoted with an "X"). Layer-2 event 190 can affect the layer-2 forwarding information associated with the tunnel/virtual network instances. As a result, the forwarding information of each of the instances is updated by the corresponding module. When switch 102 detects layer-2 event 190, switch 102 determines that port 131 is unavailable (e.g., due to a failure). As a result, layer-2 module 123 flushes the MAC addresses learned from port 131. This causes layer-3 module 124 to issue an ARP request for the IP address of switch 103. Layer-3 module 124 then receives an ARP response comprising a mapping between the IP and MAC addresses of switch 103 via port 132.

Layer-2 module 123 learns the MAC address from the ARP response via port 132. In some embodiments, layer-2 module 123 obtains learned MAC address information from layer-2 module 133. Upon receiving the ARP response, layer-3 module 124 obtains information associated with port 132 from layer-2 module 123 (e.g., from which port layer-2 module 123 has learned the MAC address) via a notification message 182. This message triggers a switchover, which causes layer-3 module 124 to select port 132 for forwarding traffic that was previously forwarded by port 131. In some embodiments, ports 131 and 132 are part of a link aggregation, which operates as a single logical link. The link aggregation can be in a virtual link aggregation group (vLAG), which operates as a single logical link with "active-active" forwarding and couples an end device to a plurality of switches.

Based on the ARP resolution, layer-3 module 124 associates port 132 with the IP address to MAC address mapping. Since the port of the ARP resolution has changed, a respective tunnel and/or virtual network instances for which switch 103 is the next-hop switch needs this updated information for providing its outer layer-2 header. In some embodiments, layer-2 module 123 and layer-3 module 124 use inter-process communication (IPC) messages for exchanging notification messages. Examples of inter-process communication messages include, but are not limited to, a socket, shared memory, a message queue, message passing, and pipes.

With existing technologies, layer-3 module 124 notifies a respective tunnel and/or virtual network module of switch 102 regarding the updated information, such as that the ARP has been resolved at port 132. The tunnel/virtual network module, in turn, generates a control message associated with each instance of the corresponding tunnel/virtual network notifying the corresponding module of a respective line card for updating the forwarding hardware of the line card. For example, VPLS module 127 of control card 120 notifies a corresponding VPLS module 137 of line card 114 for a respective VPLS instance. VPLS module 137 then updates the forwarding hardware of line card 114. In the same way, VPLS module 127 notifies a corresponding VPLS module of line cards 112, 116, and 118. As a result, a large number of control messages are generated and propagated within switch 102, requiring extensive processing at control card 120. This can cause a longer convergence time for switch 102.

To solve this problem, embodiments of the present invention facilitate efficient management of the control messages in switch 102. Furthermore, a respective module in a line card registers with the layer-3 module of the line card to receive notification. For example, MPLS module 135, VXLAN module 136, and VPLS module 137 of line card 114 register with layer-3 module 134 for receiving notification associated with a layer-2 event. As a result, MPLS module 135, VXLAN module 136, or VPLS module 137 receives a corresponding notification message from layer-3 module 134 regarding the layer-2 event. It should be noted that layer-2 module 123 can communicate with layer-2 module 133 to send or receive information associated with a layer-2 event, such as the learning of the MAC address associated with the ARP resolution.

Instead of causing a respective tunnel/virtual network module to generate a notification message for each tunnel/virtual network instance, layer-3 module 124 notifies layer-3 module 134 of line card 114 regarding layer-2 event 190. Layer-3 module 124 can send a control message 184 via the internal communication channel (e.g., an internal control bus) of switch 102 to layer-3 module 134. In the same way, layer-3 module 124 sends a control message for the layer-3 module of line cards 112, 116, and 118. Layer-3 module 134 then sends one or more notification messages 186 to notify a respective tunnel/virtual network module in line card 114. For example, layer-3 module 134 notifies MPLS module 135 regarding the updated information. MPLS module 135 then updates the entry associated with a respective MPLS instance in the forwarding hardware of line card 114.

In the same way, a respective tunnel/virtual network module then updates the entries of a respective instance associated with the module in the forwarding hardware of line card 114. Since the tunnel/virtual network module updates the forwarding hardware at line card 114 based on the notification from layer-3 module 134, the module at the line card does not rely on a message from the corresponding module of control card 120. In this way, control card 120 provides fast convergence to switch 102 upon detecting layer-2 event 190 by reducing the notifications across control card 120 as well as the control messages within switch 102.

Figure 1B:
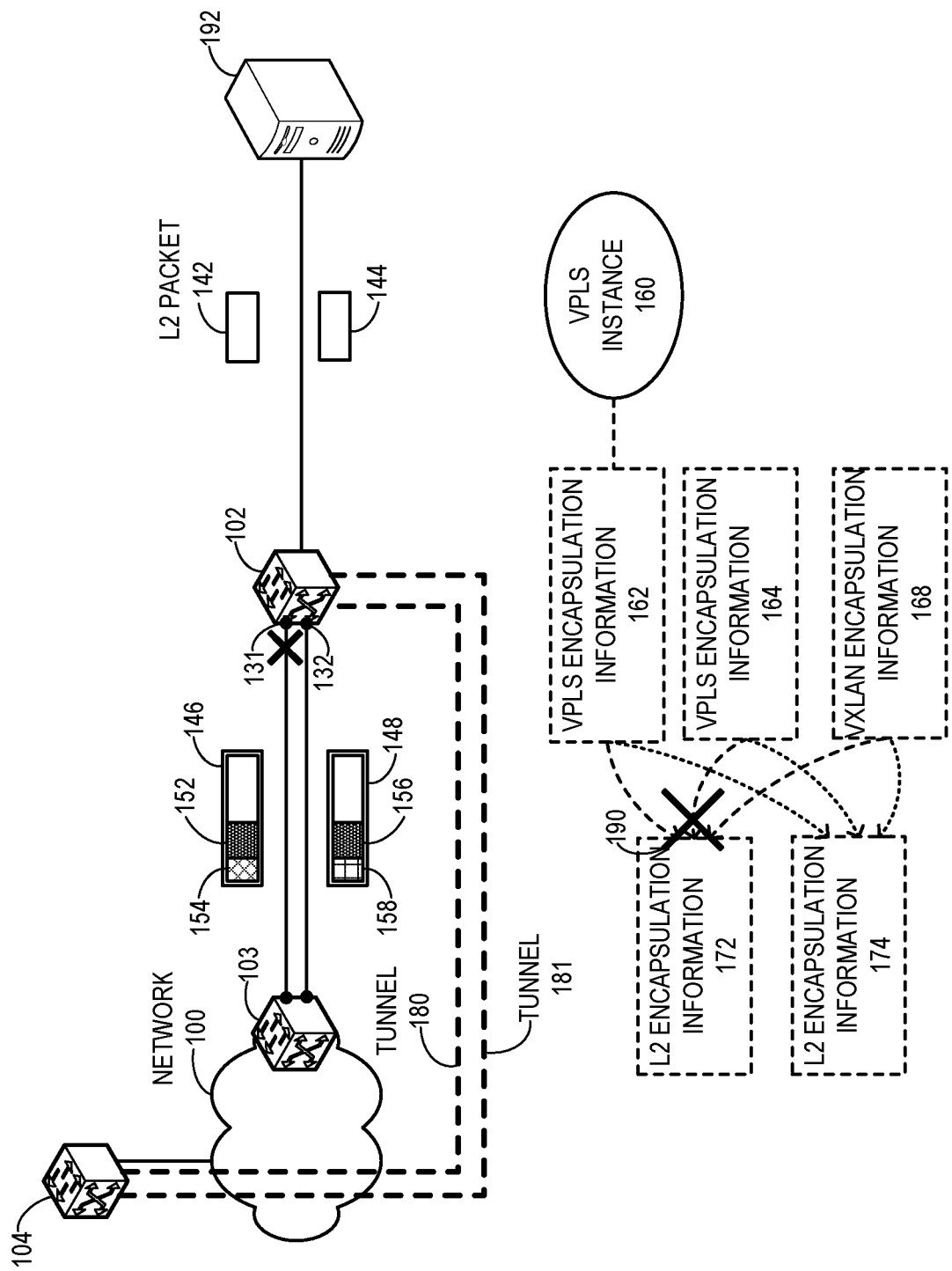
FIG. 1B illustrates an exemplary change to layer-2 forwarding information associated with overlay tunnels, in accordance with an embodiment of the present invention.

FIG. 1B illustrates an exemplary change to layer-2 forwarding information associated with overlay tunnels, in accordance with an embodiment of the present invention. In this example, switch 102 is coupled with an end device 192, which can be a physical device or a virtual machine running on a physical host. In this example, tunnel 180 can be an MPLS tunnel, which supports multiple VPLS instances. Switch 102 maintains encapsulation information (e.g., MPLS labels, pseudo-wire labels, control words, etc.) for each VPLS instance. In addition, switches 102 and 104 can establish and maintain a VXLAN tunnel 181, which can be represented by a corresponding VXLAN instance. Switch 102 can also maintain encapsulation information (e.g., source and destination IP addresses, User Datagram Protocol (UDP) information, VXLAN network identifier (VNI), etc.) associated with the VXLAN instance. Suppose that switch 102 maintains VPLS encapsulation information 162 and 164 for two VPLS instances. Similarly, switch 102 maintains VXLAN encapsulation information 166 for the VXLAN instance.

The VPLS instances and the VXLAN instance of switch 102 can have the same next-hop switch 103. Hence, these instances may use the same layer-2 encapsulation information, which can be used to generate the outer layer-2 header for each of these instances. In this example, VPLS encapsulation information 162 and 164, and VXLAN encapsulation information 166 point to the same layer-2 encapsulation information 172, which is associated with port 131. This allows switch 102 to efficiently manage the layer-2 encapsulation information. Switch 102 uses the encapsulation information of a tunnel/virtual network instance to generate the encapsulation header (e.g., for VXLAN, it can be the outer layer-3 header and the VXLAN header). Switch 102 also uses layer-2 encapsulation information 172 to generate the outer layer-2 header.

During operation, switch 102 receives a layer-2 packet (e.g., an Ethernet frame) 142 from end device 192. Suppose that packet 142 is associated with a VPLS instance 160 associated with VPLS encapsulation information 162. Upon receiving packet 142, switch 102 obtains VPLS encapsulation information 162 and encapsulates packet 142 with an encapsulation header 152 based on VPLS encapsulation information 162. Switch 102 also obtains layer-2 encapsulation information 172 and adds an outer layer-2 header 154. In this way, switch 102 generates an encapsulated packet 146, which includes packet 142 as a payload. Switch 102 then forwards packet 146 using port 131 via tunnel 180.

Upon detecting layer-2 event 190, switch 102 initiates switchover to port 132. Switch 102 then updates VPLS encapsulation information 162 and 164, and VXLAN encapsulation information 166 to point to layer-2 encapsulation information 174, which is associated with port 132, in the forwarding hardware of a respective line card. In some embodiments, switch 102 determines layer-2 encapsulation information 174 based on an ARP resolution via port 132. In this way, switch 102 facilitates a fast convergence in layer-2 event 190, as described in conjunction with FIG. 1A. When switch 102 receives another layer-2 packet 144 from end device 192 after layer-2 event 190 has occurred, switch 102 encapsulates packet 144 with an encapsulation header 156 based on VPLS encapsulation information 162. Switch also obtains layer-2 encapsulation information 174, adds an outer layer-2 header 158, and generates an encapsulated packet 148, which includes packet 144 as a payload. Switch 102 then forwards packet 148 using port 132 via tunnel 180.

Fast Convergence of Multi-Destination Traffic

Figure 2A:
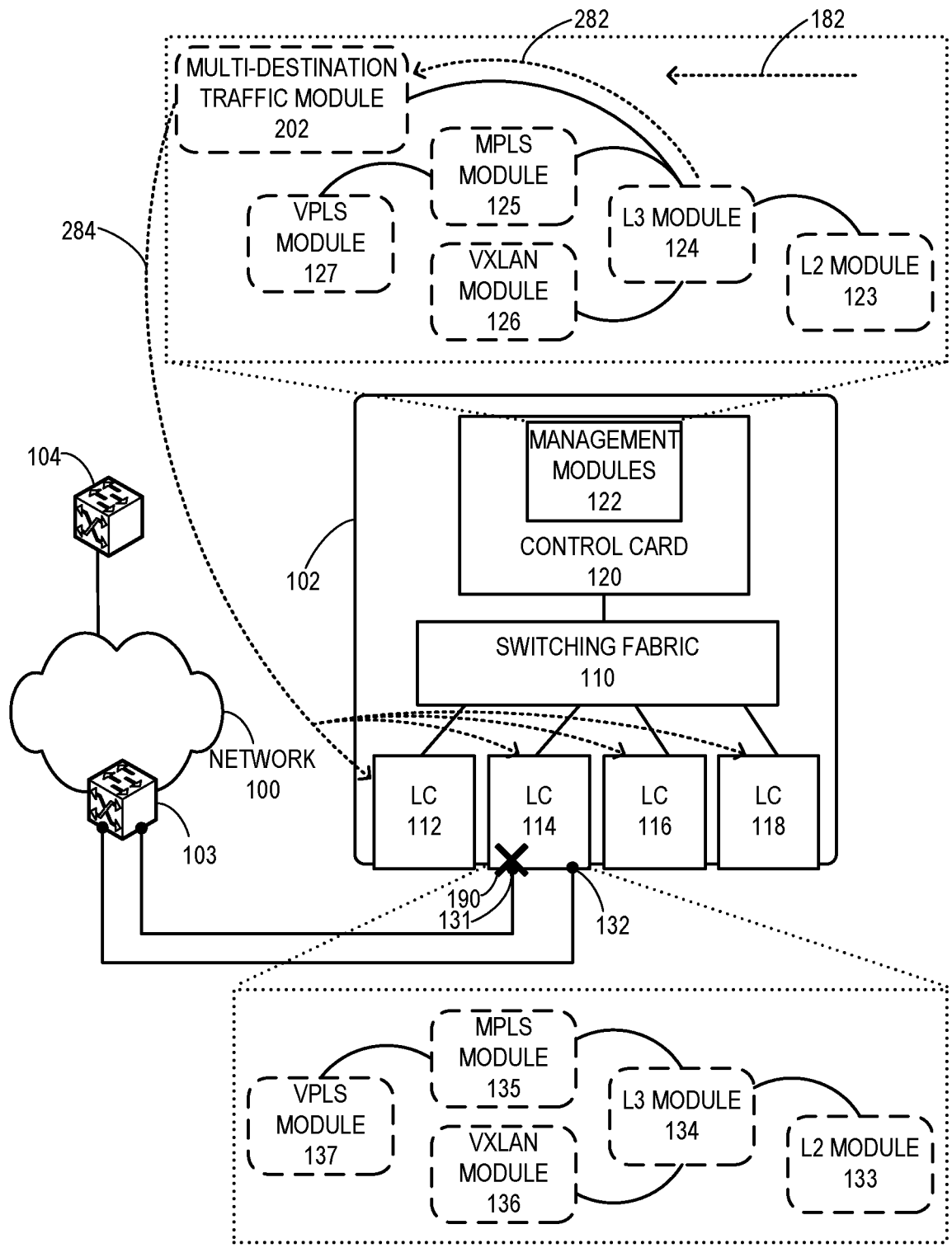
FIG. 2A illustrates an exemplary switch facilitating fast convergence for multi-destination traffic in response to a layer-2 event, in accordance with an embodiment of the present invention.

FIG. 2A illustrates an exemplary switch facilitating fast convergence for multi-destination traffic in response to a layer-2 event, in accordance with an embodiment of the present invention. To manage multi-destination traffic (e.g., BUM traffic), management modules 122 of switch 102 can include a multi-destination traffic module 202, which is responsible for managing the forwarding information associated with multi-destination traffic for overlay tunnels in a respective line card. Furthermore, multi-destination traffic module 202 also configures the traffic manager of a respective line card for multi-destination traffic.

With existing technology, upon receiving a notification regarding layer-2 event 190, a respective tunnel/virtual network module of control card 120 sends a notification message to multi-destination traffic module 202 for a respective tunnel/virtual network instance. This notification message includes the updated layer-2 information. In response, multi-destination traffic module 202 configures a respective line card and its traffic manager and updates the forwarding information for multi-destination traffic (e.g., updates reverse path forwarding) for a respective instance. This leads to extensive processing and message exchanges at control card 120. As a result, switch 102 may face a longer convergence time for multi-destination traffic.

To solve this problem, embodiments of the present invention facilitate efficient management of the control messages to multi-destination traffic module 202. Instead of receiving notification for each instance of a tunnel/virtual network, multi-destination traffic module 202 registers with layer-3 module 124 for receiving notification regarding layer-2 events. Hence, MPLS module 125, VXLAN module 126, and VPLS module 127 refrain from sending notifications to multi-destination traffic module 202 regarding layer-2 events. Upon receiving notification message 182, layer-3 module 124 sends a notification message 282 to multi-destination traffic module 202 comprising the updated forwarding information based on the ARP resolution via port 132.

In some embodiments, multi-destination traffic module 202 maintains a list (e.g., a linked list, an array, a database table, etc.) that lists the encapsulation information of a respective tunnel/virtual network instance that needs configuration from multi-destination traffic module 202. Upon receiving notification message 282, multi-destination traffic module 202 sends one or more control messages 284 to a respective line card. Multi-destination traffic module 202 can traverse the list and send a control message to a respective line card for a respective instance. Such a control message can include configuration information for the traffic manager of a line card and the updated forwarding information associated with a tunnel/virtual network instance. The corresponding module in the line card then updates the forwarding hardware of the line card with the updated forwarding information. In this way, multi-destination traffic module 202 reduces the notifications across the control card as well as the control messages within the switch.

Figure 2B:
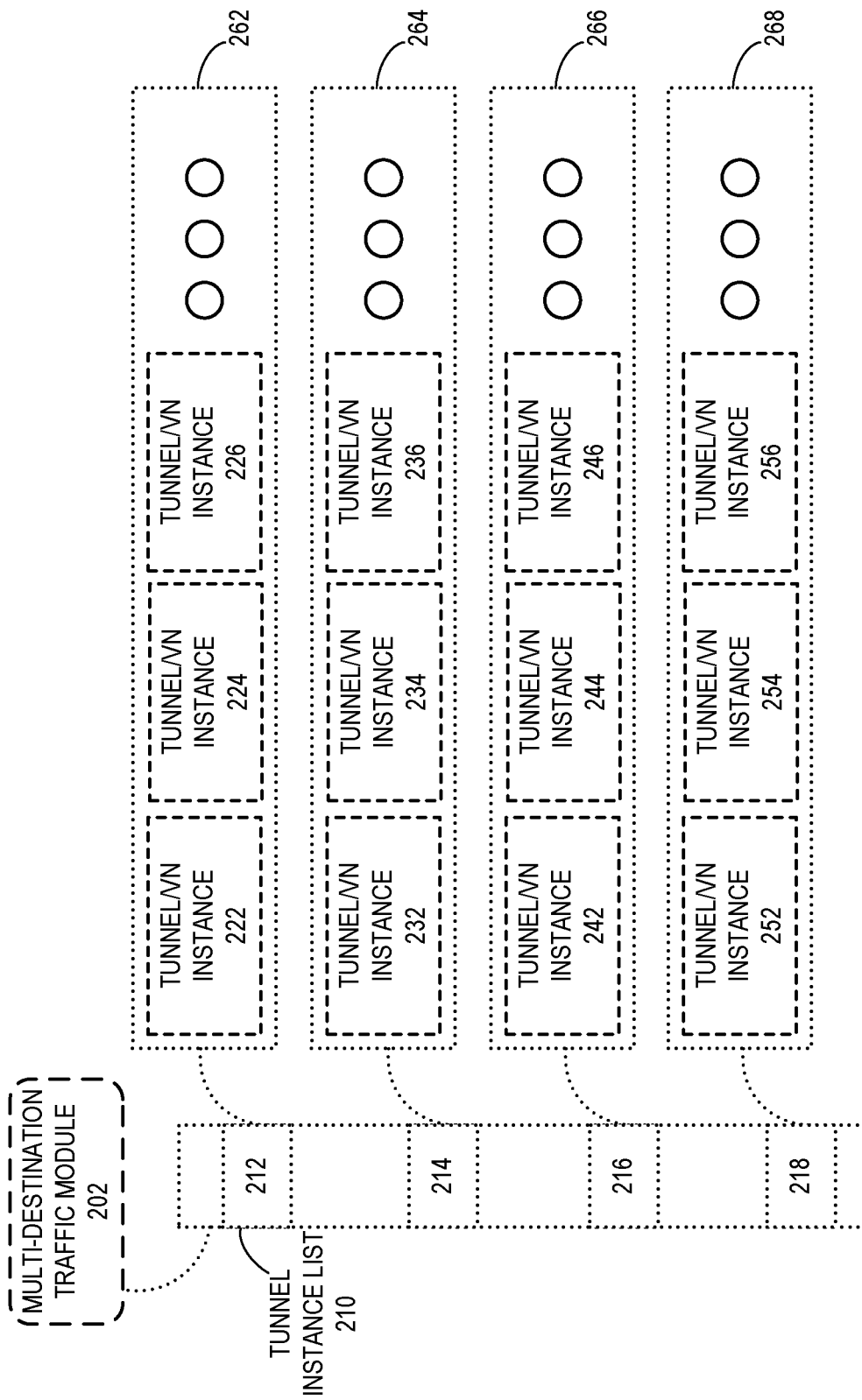
FIG. 2B illustrates an exemplary data structure for facilitating fast convergence for multi-destination traffic in response to a layer-2 event, in accordance with an embodiment of the present invention.

FIG. 2B illustrates an exemplary data structure for facilitating fast convergence for multi-destination traffic in response to a layer-2 event, in accordance with an embodiment of the present invention. Multi-destination traffic module 202 maintains a tunnel instance list 210. A respective entry in tunnel instance list 210 can correspond to a line card of switch 102. In this example, entries 212, 214, 216, and 218 correspond to line cards 112, 114, 116, and 118, respectively, of switch 102. A respective entry in tunnel instance list 210 can point to a list of tunnel and virtual network instances for the corresponding line card.

Upon receiving the updated information from layer-3 module 124, multi-destination traffic module 202 traverses tunnel instance list 210 and retrieves an entry from list 210. Multi-destination traffic module 202 identifies the line card and the tunnel/virtual network instance associated with the entry, and configures the line card with the updated information for the tunnel/virtual network instance. Multi-destination traffic module 202 also updates the forwarding hardware of the line card with the updated information for the tunnel/virtual network instance.

Entry 212 can include a list 262, which includes a plurality of tunnel/virtual network instances, such as instances 222, 224, and 226, instantiated in line card 112. Entry 214 can include a list 264, which includes a plurality of tunnel/virtual network instances, such as instances 232, 234, and 236, instantiated in line card 114. Entry 216 can include a list 266, which includes a plurality of tunnel/virtual network instances, such as instances 242, 244, and 246, instantiated in line card 116. Entry 218 can include a list 268, which includes a plurality of tunnel/virtual network instances, such as instances 252, 254, and 256, instantiated in line card 118.

Here, entry 212 can include a pointer to a list 262 that includes the tunnel and virtual network instances of line card 112. In this way, tunnel instance list 210 can be a doubly linked list or a multi-dimensional array. It should be noted that if the same tunnel/virtual network instances are instantiated in a respective line card, entries of tunnel instance list 210 can include the tunnel/virtual network instances. Under such circumstances, multi-destination traffic module 202 can use the same list of tunnel/virtual network instances for a respective line card. In some embodiments, list 210 can include the tunnel/virtual instances, such as instances 222, and 234, instead of entries 212, 214, 216, and 218. Multi-destination traffic module 202 then can include an indicator the tunnel/virtual network instances indicating which instance is associated with which line card.

Operations for Fast Convergence

Figure 3A:
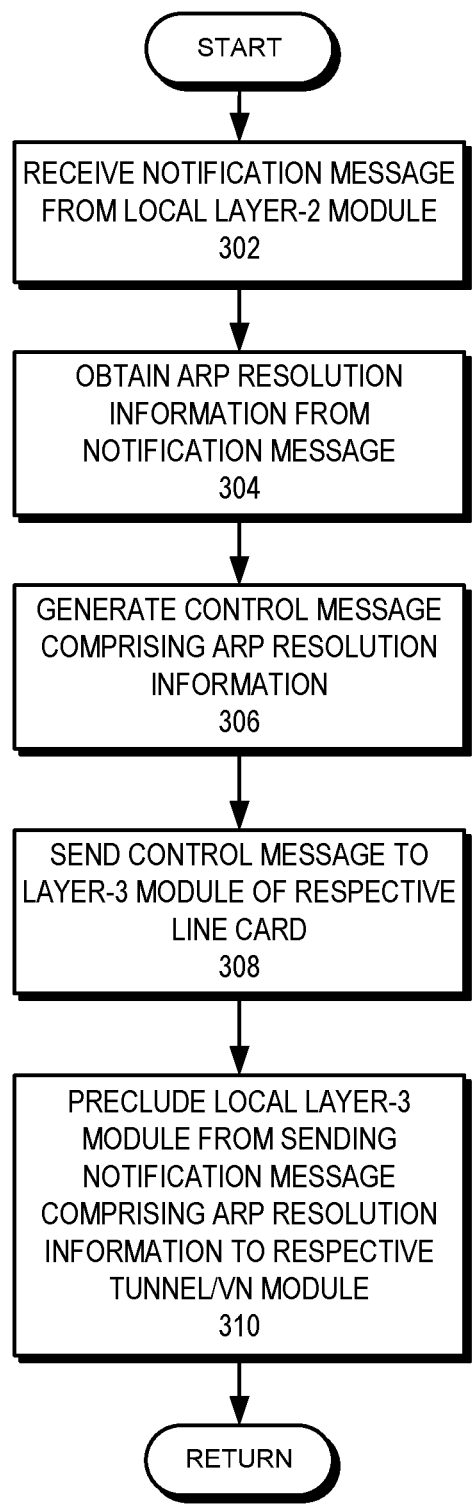
FIG. 3A presents a flowchart illustrating an exemplary process of a layer-3 module in a control card of a switch efficiently managing a layer-2 event, in accordance with an embodiment of the present invention.

FIG. 3A presents a flowchart illustrating an exemplary process of a layer-3 module in a control card of a switch efficiently managing a layer-2 event, in accordance with an embodiment of the present invention. During operation, the layer-3 module receives a notification message from a local layer-2 module, which is on the same control card (operation 302) and obtains ARP resolution information from the notification message (operation 304). The ARP resolution information can include the port from which the layer-2 module has learned the MAC address of the ARP resolution. The layer-3 module generates a control message comprising the ARP resolution information (operation 306) and sends the control message to the layer-3 module of a respective line card (operation 308). In some embodiments, the layer-3 module precludes the local layer-3 module from sending a notification message comprising the ARP resolution information to a respective tunnel/virtual network module (operation 310).

Figure 3B:
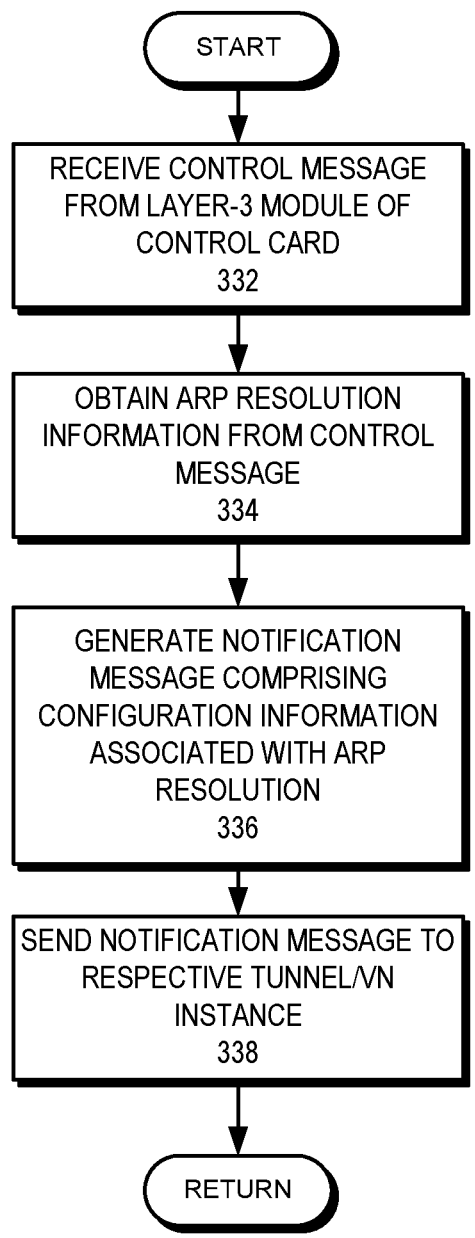
FIG. 3B presents a flowchart illustrating an exemplary process of a layer-3 module in a line card of a switch efficiently propagating changes associated with a layer-2 event, in accordance with an embodiment of the present invention.

FIG. 3B presents a flowchart illustrating an exemplary process of a layer-3 module in a line card of a switch efficiently propagating changes associated with a layer-2 event, in accordance with an embodiment of the present invention. During operation, the layer-3 module receives a control message from the layer-3 module of the control card of the switch (operation 332). The layer-3 module obtains the ARP resolution information from the control message (operation 334). The layer-3 module generates a notification message comprising configuration information associated with the ARP resolution (operation 336) and sends the notification message to a respective tunnel/virtual network instance (operation 338). The configuration information can include the information needed to update a forwarding entry in the forwarding hardware of a line card based on the ARP resolution information.

Figure 3C:
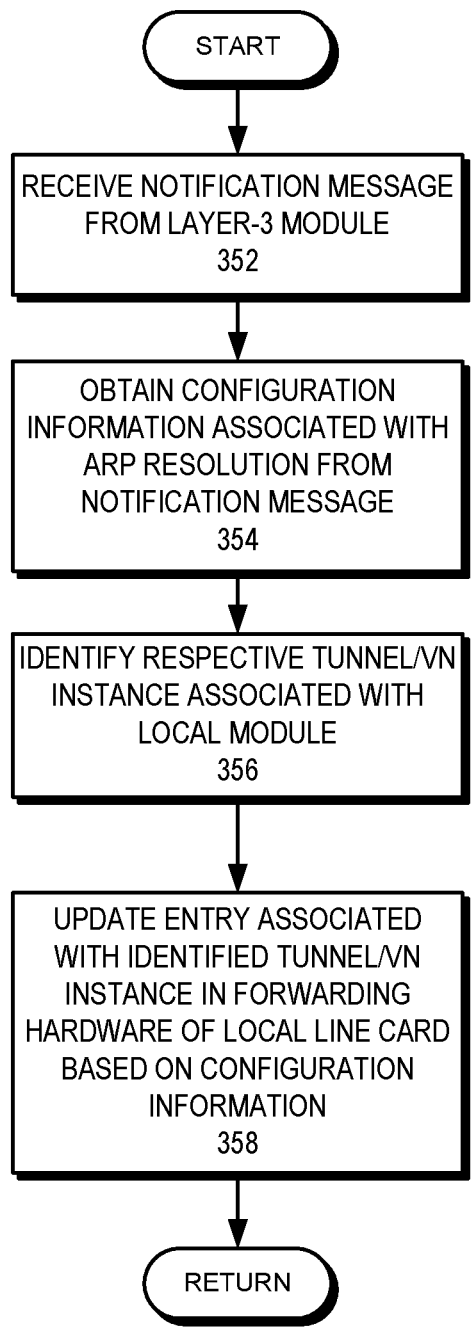
FIG. 3C presents a flowchart illustrating an exemplary process of a tunnel/virtual network module in a line card of a switch incorporating changes associated with a layer-2 event, in accordance with an embodiment of the present invention.

FIG. 3C presents a flowchart illustrating an exemplary process of a tunnel/virtual network module in a line card of a switch incorporating changes associated with a layer-2 event, in accordance with an embodiment of the present invention. During operation, the module receives a notification message from the layer-3 module of the line card (operation 352). The module obtains the configuration information associated with the ARP resolution from the notification message (operation 354). The module identifies a respective tunnel/virtual network associated with the local module (operation 356). The module updates the entry associated with the identified tunnel/virtual network instance in the forwarding hardware of the local line card based on the configuration information (operation 356).

Figure 4A:
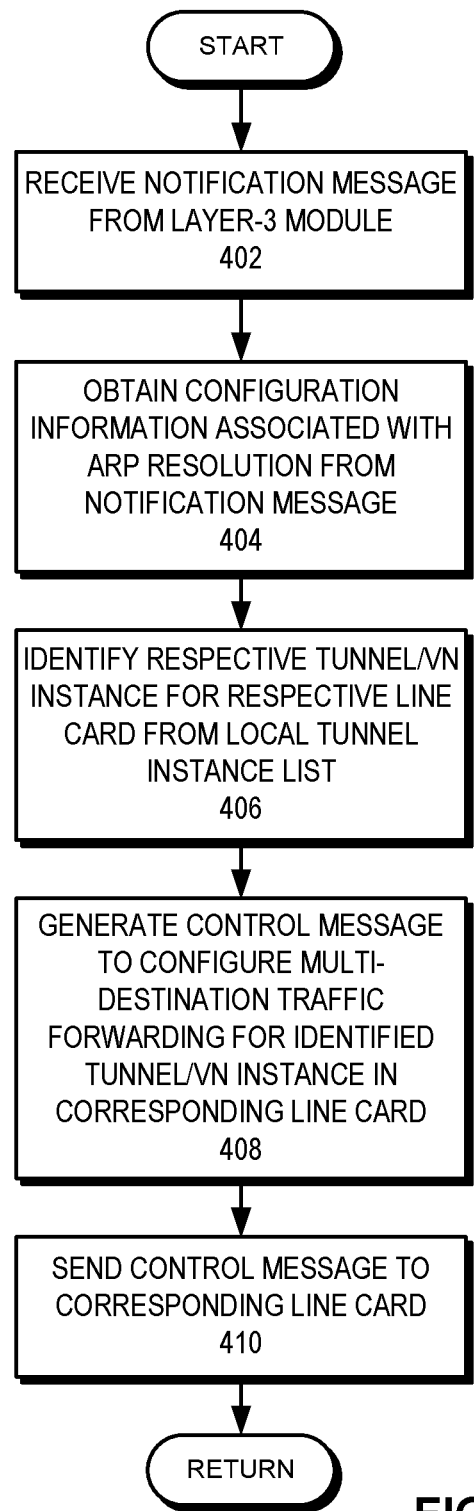
FIG. 4A presents a flowchart illustrating an exemplary process of a multi-destination traffic module in a control card of a switch efficiently managing a layer-2 event for multi-destination traffic, in accordance with an embodiment of the present invention.

FIG. 4A presents a flowchart illustrating an exemplary process of a multi-destination traffic module in a control card of a switch efficiently managing a layer-2 event for multi-destination traffic, in accordance with an embodiment of the present invention. Here, the multi-destination traffic module is registered with the layer-3 module of the control card. During operation, the multi-destination traffic module receives a notification message from the layer-3 module (operation 402). It should be noted that the multi-destination traffic module does not receive a notification message from an instance.

The multi-destination traffic module obtains the configuration information associated with the ARP resolution from the notification message (operation 404). The multi-destination traffic module identifies a respective tunnel/virtual network instance for a respective line card from a local tunnel instance list (operation 406). The multi-destination traffic module generates a control message to configure multi-destination traffic forwarding for the identified tunnel/virtual network instance in the corresponding line card (operation 408). The multi-destination traffic module then sends the control message to the corresponding line card (operation 410).

Figure 4B:
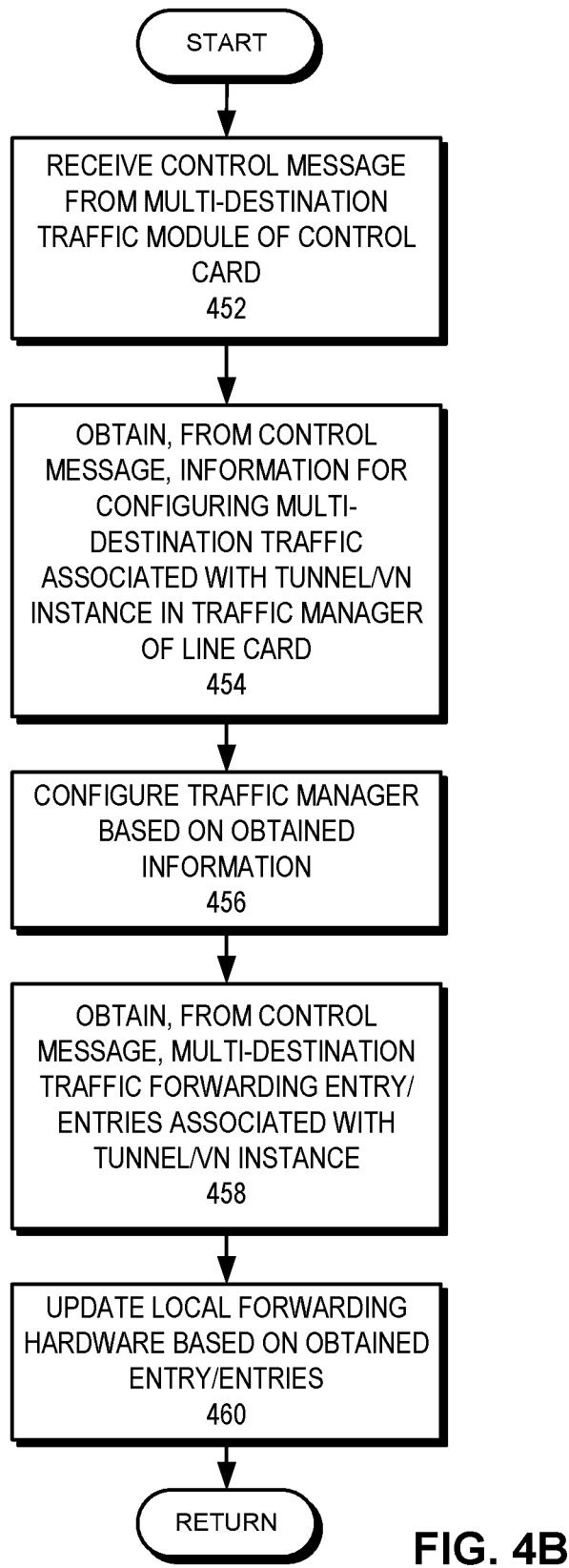
FIG. 4B presents a flowchart illustrating an exemplary process of a line card of a switch incorporating changes associated with a layer-2 event for multi-destination traffic, in accordance with an embodiment of the present invention.

FIG. 4B presents a flowchart illustrating an exemplary process of a line card of a switch incorporating changes associated with a layer-2 event for multi-destination traffic, in accordance with an embodiment of the present invention. During operation, the line card receives a control message from the multi-destination traffic module of the control card (operation 452). The line card obtains, from the control message, information for configuring multi-destination traffic associated with a tunnel/virtual network instance in the traffic manager of the line card (operation 454). The line card then configures the traffic manager based on the obtained information (operation 456). The line card also obtains, from the control message, the multi-destination traffic forwarding entry/entries associated with the tunnel/virtual network instance (operation 458). The line card then updates the local forwarding hardware based on the obtained entry/entries (operation 460).

Intelligent Buffering and Adaptive Synchronization

Figure 5A:
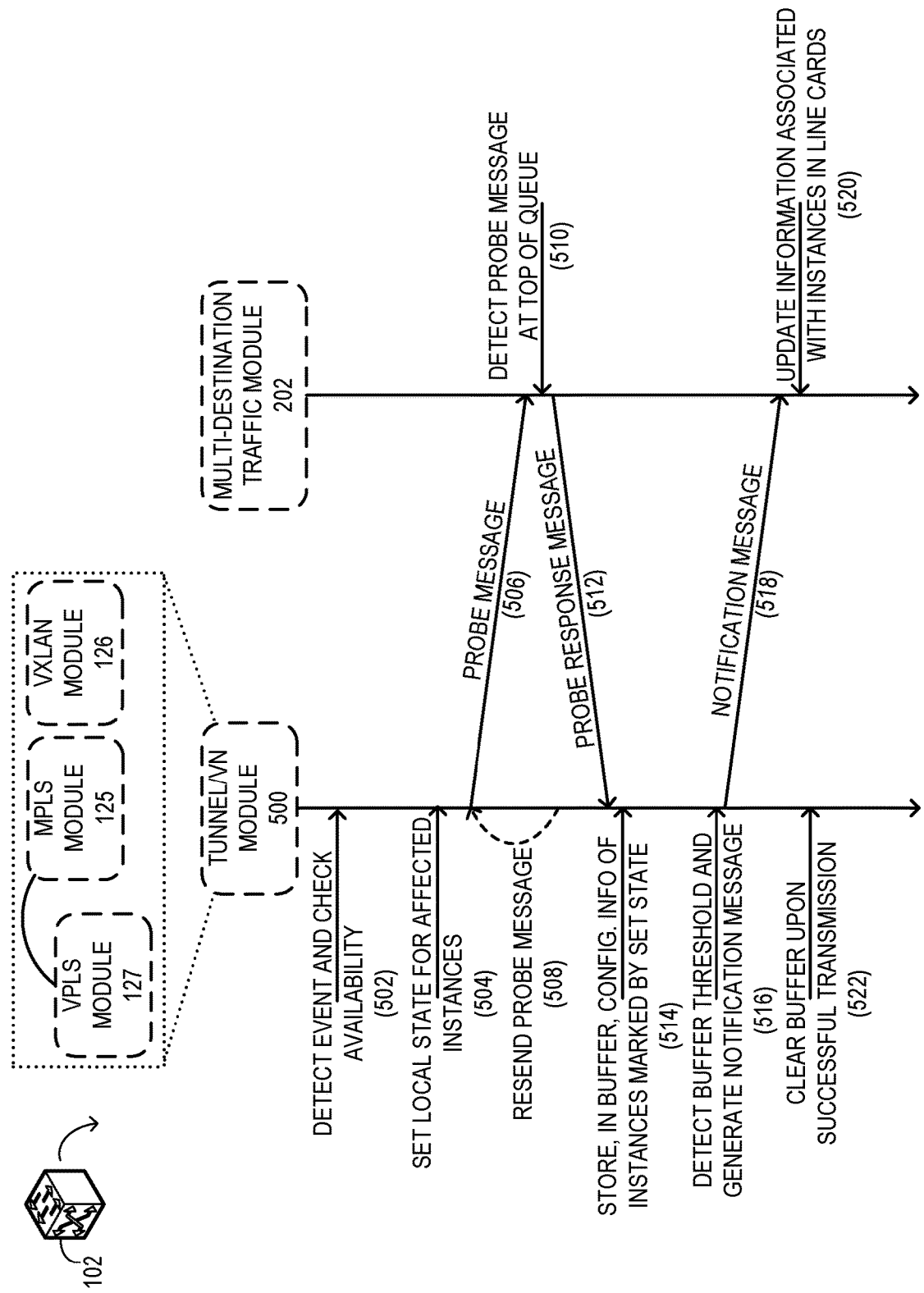
FIG. 5A illustrates an exemplary communication for facilitating intelligent buffering and adaptive synchronization for efficiently managing an event for multi-destination traffic, in accordance with an embodiment of the present invention.

FIG. 5A illustrates an exemplary message exchange for facilitating intelligent buffering and adaptive synchronization for efficiently managing an event for multi-destination traffic, in accordance with an embodiment of the present invention. During operation, switch 102 may detect an event (e.g., a layer-3, configuration, network, or operational event). This event may change layer-3 information associated with a tunnel/virtual network, such as a change of IP address or the layer-3 next-hop switch. Such an event may cause a tunnel/virtual network module to send a notification message to multi-destination traffic module 202 for a respective instance associated with the module.

With existing technologies, multi-destination traffic module 202 can be in an occupied state when many of these notifications arrive. As a result, multi-destination traffic module 202 may not receive the notification message from tunnel/virtual network module 500 of switch 102. In this example, tunnel/virtual network module 500 can be one of: MPLS module 125, VXLAN module 126, and VPLS module 127. If module 500 detects an unsuccessful transmission of the notification message (e.g., by detecting a failure to transmit an IPC message), module 500 resends the notification message. This leads to repeated resending of these instructions, which causes additional processing in switch 102 and delay in convergence.

To solve this problem, embodiments of the present invention allow module 500 to utilize intelligent buffering of the updates and adaptive synchronization with multi-destination traffic module 202. During operation, module 500 detects an event (e.g., a configuration event) and checks the availability of multi-destination traffic module 202 (operation 502). Suppose that module 500 detects that multi-destination traffic module 202 is busy. Module 500 then sets a local state for a respective tunnel/virtual network instance, which is associated with module 500 and affected by the event, to be "updated" (operation 504). In some embodiments, the "updated" state can be indicated by setting a bit (e.g., a dirty bit) for that instance. For example, if module 500 is VXLAN module 126, module 500 maintains a list of the VXLAN tunnel instances in switch 102 and sets a local state for a VXLAN instance affected by the event as "updated" in the entry for the instance in the list.

Module 500 sends a probe message to multi-destination traffic module 202 (operation 506). This probe message can be short in length and, therefore, ensures that the overhead of probe message processing in multi-destination traffic module 202 is nominal. If module 500 does not receive a response within a predetermined time, module 500 can resend the probe message (operation 508). Upon receiving the probe message, multi-destination traffic module 202 can add this probe message to the processing queue. Multi-destination traffic module 202 eventually detects the probe message at the top of the queue (operation 510), thereby determining that multi-destination traffic module 202 is available for processing control instructions. However, if multi-destination traffic module 202 is in an occupied state executing other instructions when the probe message is sent, multi-destination traffic module 202 may not receive the probe message. This causes the probe message to time out and module 500 to resend the probe message (operation 508).

If multi-destination traffic module 202 is available, multi-destination traffic module 202 detects the probe message at the top of its queue (operation 510) and sends a probe response message to module 500 (operation 512). Upon receiving the probe response message, module 500 determines that multi-destination traffic module 202 is available. Module 124 then stores, in a buffer, configuration information of the instances marked by the set state (e.g., the "updated" state) (operation 514). If module 500 detects a buffer threshold (e.g., the buffer has reached a predetermined size or a timer for the buffer has expired), module 500 generates a notification message with the configuration information in the buffer (operation 516). Module 500 then sends the notification message (operation 518).

Upon receiving the notification message, multi-destination traffic module 202 updates the information associated with the tunnel/virtual network instance in the line cards of switch 102 (operation 520). For example, if the next-hop IP address has changed for an instance, multi-destination traffic module 202 may update the entry associated with the instance in the forwarding hardware of a respective line card. Multi-destination traffic module 202 may obtain the updated information from an ARP resolution. If module 500 detects a successful transmission, module 500 clears the buffer (operation 522).

Figure 5B:
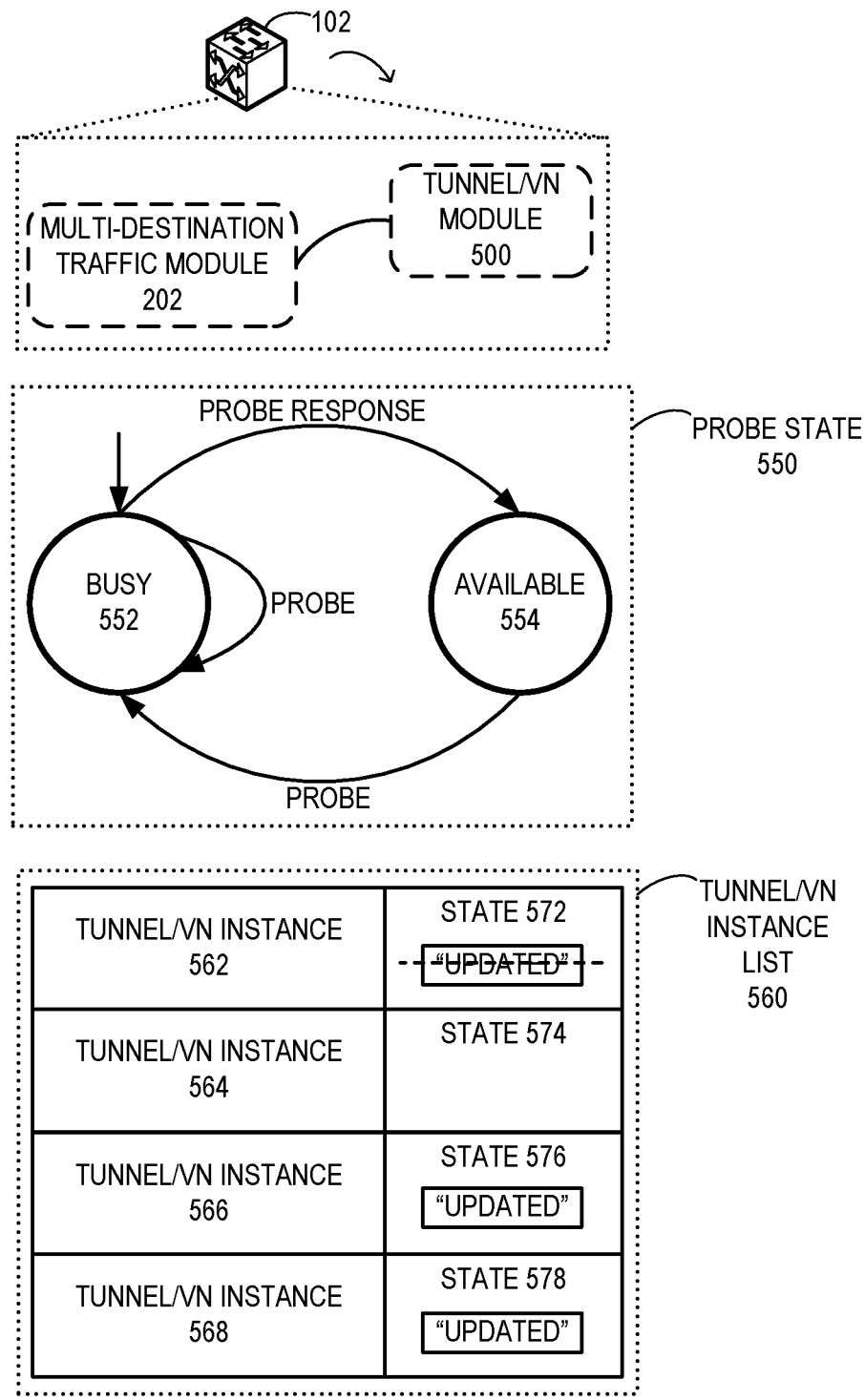
FIG. 5B illustrates exemplary global and local states for facilitating intelligent buffering and adaptive synchronization for efficiently managing an event for multi-destination traffic, in accordance with an embodiment of the present invention.

FIG. 5B illustrates exemplary global and local states for facilitating intelligent buffering and adaptive synchronization for efficiently managing an event for multi-destination traffic, in accordance with an embodiment of the present invention. To utilize intelligent buffering and adaptive synchronization, switch 102 maintains global and local states. The global states indicate the state of multi-destination traffic module 202, which is referred to as probe state 550, based on the probe message exchange. Global states can be accessed and modified by any of the modules participating in the probe message exchange. Furthermore, a respective local state is associated with a corresponding tunnel/virtual network instance. It should be noted that a respective module maintains its own local states, which are not accessible by other modules.

Probe state 550 indicates whether multi-destination traffic module 202 is busy. Probe state 550 includes a busy state 552 and an available state 554. Initially, probe state 550 is at busy state 552. When module 500 sends a probe message, probe state 550 remains at busy state 552. If the probe message is resent, probe state 550 still remains at busy state 552. If module 500 receives a probe response, probe state 550 transitions to available state 554. If module 500 sends a probe message while probe state 550 is in available state 554, probe state 550 transitions to busy state 552.

In some embodiments, module 500 maintains a tunnel/virtual network instance list 560, which lists a respective instance associated with module 500. Suppose that tunnel/virtual network instances 562, 564, 566, and 568 are associated with module 500. For example, if module 500 is VPLS module 127, instances 562, 564, 566, and 568 are VPLS instances. Module 500 can maintain states 572, 574, 576, and 578 for instances 562, 564, 566, and 568, respectively. If an event affects instances 562, 566, and 568, and probe state 550 is in busy state 552, module 500 sets states 572, 576, and 578 as "updated" instead of sending individual notification messages to multi-destination traffic module 202.

If probe state 550 is in available state 554, module 500 stores information associated with instances 562, 566, and 568 in a buffer and clears states 572, 576, and 578. If the buffer reaches a predetermined size or a timer associated with the buffer expires, module 500 generates a notification message comprising information associated with instances 562, 566, and 568, and sends the notification message to multi-destination traffic module 202. If module 500 detects a successful transmission of the notification message, module 500 clears the buffer. In this way, module 500 uses local and global states to facilitate intelligent buffering and adaptive synchronization.

It should be noted that module 500 can update the states in list 560 to indicate the most relevant updates. For example, module 500 can detect another event that affects instances 566 and 568, and renders the previous event irrelevant for instance 562. Under such circumstances, the updates to instance 562 caused by the previous event may no longer be needed. Module 500 then clears state 572 (denoted with a dashed strike-though line). In this way, when probe state 550 is in available state 554, module 500 inserts the most recent and relevant updates into the buffer.

Operations for Intelligent Buffering and Adaptive Synchronization

Figure 6A:
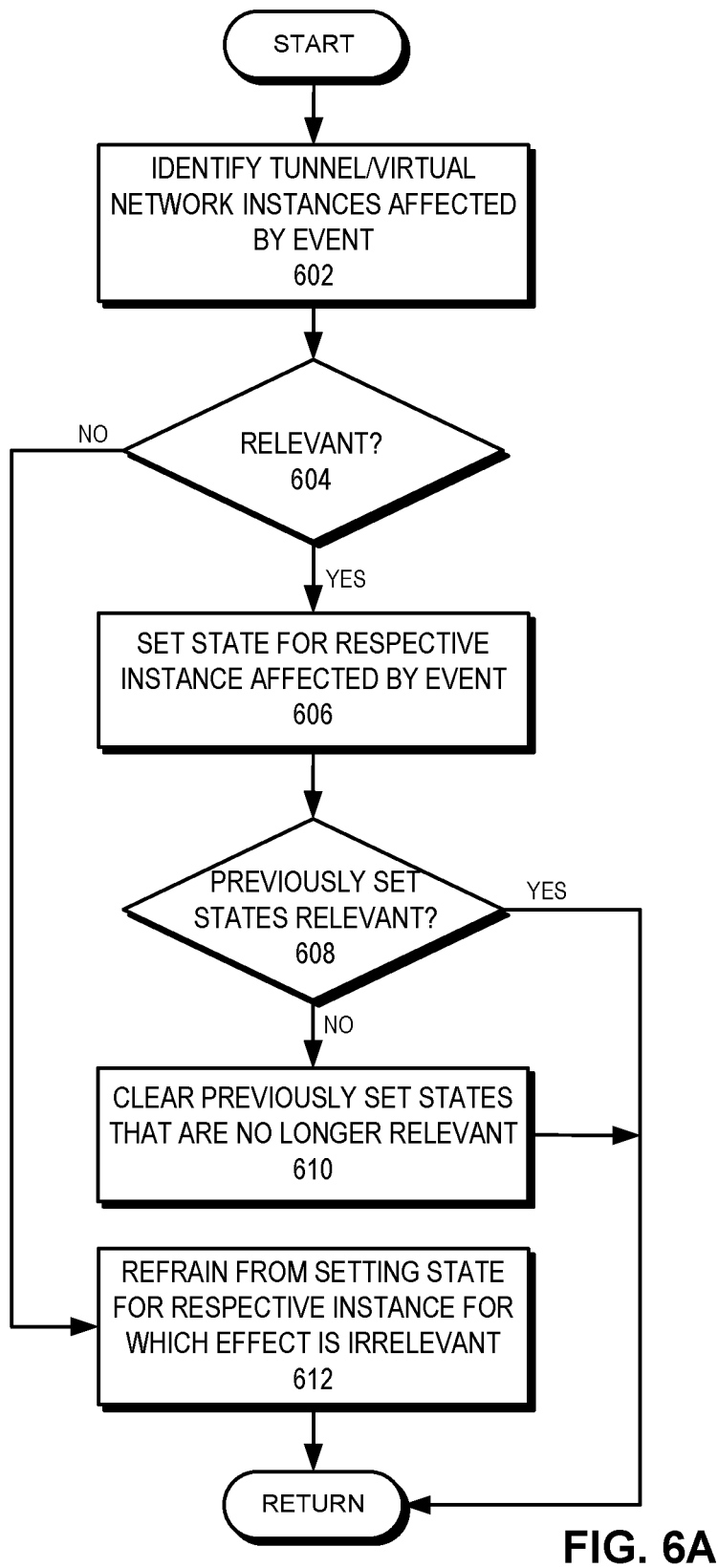
FIG. 6A presents a flowchart illustrating an exemplary process of a module in a control card of a switch facilitating intelligent buffering for efficiently managing an event for multi-destination traffic, in accordance with an embodiment of the present invention.

FIG. 6A presents a flowchart illustrating an exemplary process of a module in a control card of a switch facilitating intelligent buffering for efficiently managing an event for multi-destination traffic, in accordance with an embodiment of the present invention. During operation, the module identifies the tunnel/virtual network affected by an event (operation 602) and determines whether the effect is relevant (operation 604). An effect can become irrelevant if another event leads to such a change that the effect may not be applicable or cause a conflict.

If the effect is relevant, the module sets the state of the respective instance affected by the event (operation 606) and checks whether the previously set states are relevant (operation 608). If the previously set states are not relevant, the module clears the previously set states that are no longer relevant (operation 610). If the previously set states are relevant, the module may not change the previously set states. On the other hand, if the effect is not relevant (operation 604), the module refrains from setting state for a respective instance for which the effect is not relevant (operation 612).

Figure 6B:
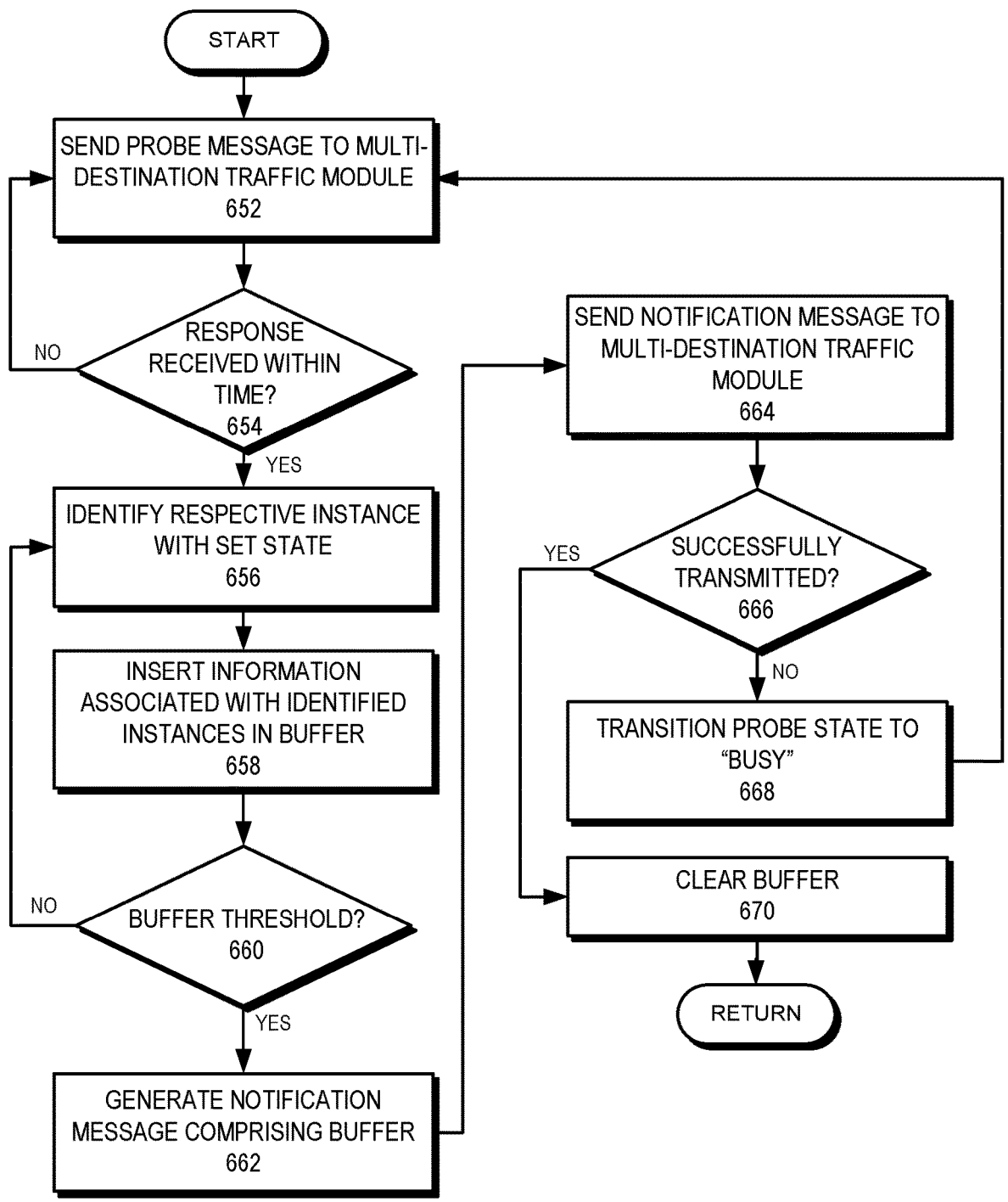
FIG. 6B presents a flowchart illustrating an exemplary process of a module facilitating adaptive synchronization for efficiently managing an event for multi-destination traffic, in accordance with an embodiment of the present invention.

FIG. 6B presents a flowchart illustrating an exemplary process of a module facilitating adaptive synchronization for efficiently managing an event for multi-destination traffic, in accordance with an embodiment of the present invention. During operation, the module sends a probe message to the multi-destination traffic module (operation 652). The module then checks whether a probe response message is received within a predetermined time (operation 654). If a probe response message is not received within a predetermined time (e.g., a timer has expired for the probe message), the module resends the probe message to the multi-destination traffic module (operation 652).

On the other hand, if a probe response message is received within a predetermined time (e.g., received without the timer expiring), the module identifies a respective instance with a set state (e.g., an "updated" state) (operation 656) and inserts information associated with the identified instances in the buffer (operation 658). Such information can include the information needed to configure the forwarding entries of the corresponding instance for multi-destination traffic in response to the event. The module checks whether the buffer has reached the buffer threshold (operation 660). If the buffer has not reached the buffer threshold, the module continues to identify a respective instance with a set state (operation 656).

On the other hand, if the buffer has reached the buffer threshold, the module generates a notification message comprising the buffer (operation 662) and sends the notification message to the multi-destination traffic module (operation 664). The module then checks whether the notification message is successfully transmitted (operation 666). If the notification message is successfully transmitted, the module clears the buffer (operation 670). If the notification message is not successfully transmitted, the module transitions the probe state to "busy" (operation 668) and sends a probe message to the multi-destination traffic module (operation 652).

Exemplary Switch

Figure 7:
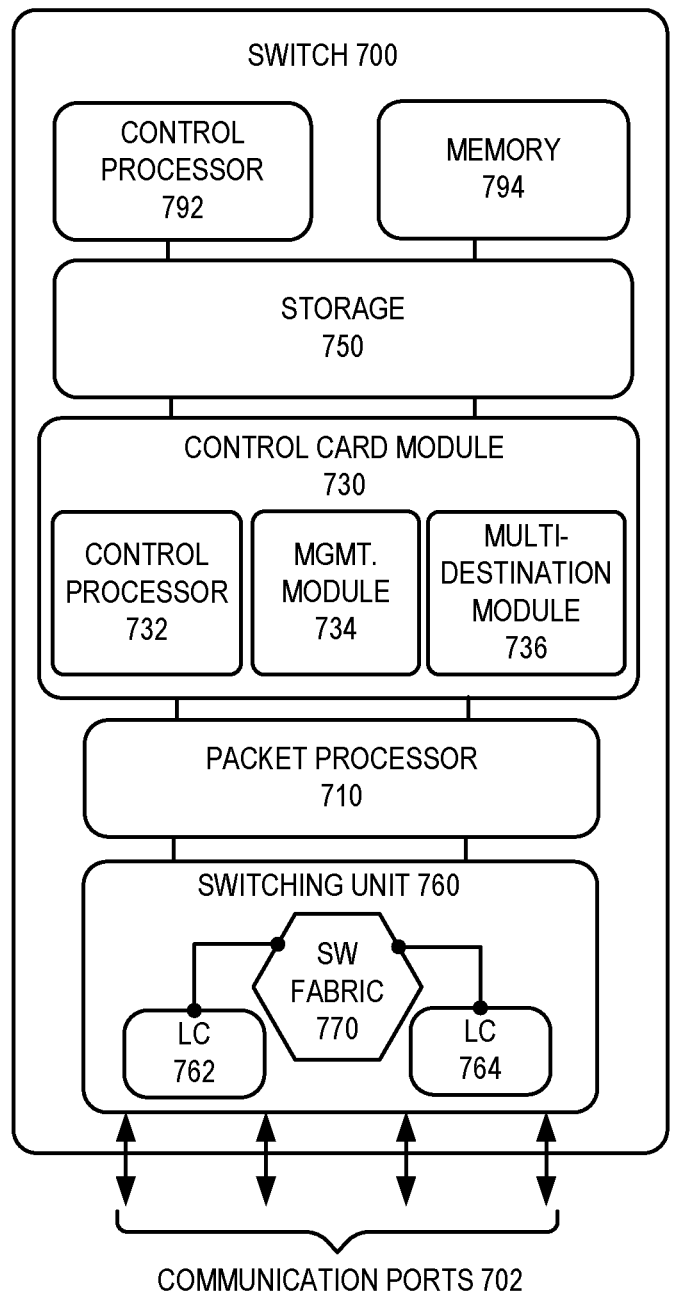
FIG. 7 illustrates an exemplary switch facilitating fast convergence in an event, in accordance with an embodiment of the present invention.

FIG. 7 illustrates an exemplary switch facilitating fast convergence in an event, in accordance with an embodiment of the present invention. In this example, a switch 700 includes a number of communication ports 702, a packet processor 710, a control card module 730, and a storage device 750. Switch 700 can also include switch modules, such as processing hardware of switch 700 (e.g., ASIC chips). Packet processor 710 extracts and processes header information from the received packets. Packet processor 710 can identify a switch identifier associated with the switch in the header of a packet. Switch 700 can also include a control processor 792 and a memory 794.

In some embodiments, switch 700 maintains a membership in a fabric switch. Switch 700 maintains a configuration database in storage device 750 that maintains the configuration state of every switch within the fabric switch. Switch 700 maintains the state of the fabric switch, which is used to join other switches. In some embodiments, switch 700 can be configured to operate in conjunction with a remote switch as an Ethernet switch.

Communication ports 702 can include inter-switch communication channels for communication within the fabric switch. This inter-switch communication channel can be implemented via a regular communication port and based on any open or proprietary format. Communication ports 702 can also include one or more extension communication ports for communication between neighbor fabric switches. Communication ports 702 can include one or more TRILL ports capable of receiving frames encapsulated in a TRILL header. Communication ports 702 can also include one or more IP ports capable of receiving IP packets. An IP port is capable of receiving an IP packet and can be configured with an IP address. Packet processor 710 can process TRILL-encapsulated frames and/or IP packets (e.g., tunnel encapsulated packets).

Switch 700 can also include a switching unit 760, which further includes one or more switch fabric cards (e.g., PCIe cards). Switching unit 760 also includes a plurality of line cards 762 and 764. The switch fabric cards facilitate switching fabric 770 of switch 700. Switching fabric 770 allows internal switching of switch 700 (i.e., switching of packets within switch 700, such as between line cards 762 and 764). In some embodiments, a respective switch fabric card is coupled to a respective line card. As a result, a packet from a line card can be switched to any other line card by any of the switch fabric cards.

A respective line card in line cards 762 and 764 includes one or more ports (e.g., ports in communication ports 702, and forwarding hardware (e.g., a TCAM). Control card module 730 determines routing and forwarding tables for switch 700, and comprises a control processor 732 (e.g., processing circuitry) and a management module 734. Management module 734 manages one or more tunnel or virtual network instances at switch 700. Management module 734 can be one or more of: MPLS module 125, VXLAN module 126, and VPLS module 127.

During operation, control card module 730 determines an event associated with the layer-2 operations of switch 700. Control card module 730 refrains from notifying management module 734 regarding the layer-2 event and notifies line card 762 (or 764) regarding the event. Line card 762 then configures one or more layer-3 forwarding entries in the forwarding hardware of line card 762 based on the notification. Control card module 730 determines the event by determining an unavailability of a first port of switch 700, obtaining an ARP response via a second port of switch 700, and associating the second port with a mapping between an IP address and a MAC address obtained from the ARP response.

In some embodiments, control card module 730 also includes a multi-destination module 736, which registers to receive information of the layer-2 event and configures a set of layer-3 forwarding entries for multi-destination traffic in the forwarding hardware of line cards 762 and 764. Control card module 730 then precludes management module 734 from notifying multi-destination module 736 regarding the layer-2 event. Multi-destination module 736 can maintain a list of tunnel and virtual network instances of the switch. Multi-destination module identifies a tunnel or virtual network instance, which is associated with line card 762, affected by the layer-2 event from the list.

In some embodiments, management module 734 determines an event associated with layer-3 operations of the switch and sends a probe message to multi-destination module 736 to determine whether multi-destination module 736 is available. If management module 734 receives a probe response message from multi-destination module 736, management module 734 sends, to multi-destination module 736, a notification message comprising information associated with a set of tunnel or virtual network instances affected by the layer-3 event. Examples of a layer-3 event include, but are not limited to, a network event, a switch event, a configuration event, or an operational event.

Management module 734 can identify the set of tunnel or virtual network instances, which are managed by the management module and affected by the layer-3 event. If management module 734 does not receive a probe response message within a period of time, management module 734 sets a state (e.g., a dirty bit indicating an "updated" state) for the identified tunnel or virtual network instances. Management module 734 can maintain a list of the tunnel or virtual network instances associated with the management module. The state of a tunnel or virtual network instance is then maintained in an entry of the tunnel or virtual network instance in the list.

If management module 734 receives the probe response message, management module 734 inserts information associated with the tunnel or virtual network instances with a set state into a buffer. If the buffer reaches a threshold, management module 734 includes the information of the buffer in the notification message. If the management module 734 detects an unsuccessful transmission of the notification message, management module 734 sends a second probe message to multi-destination module 736 to determine whether multi-destination module 736 is available. Management module 734 can determine whether multi-destination module 736 is available based on a global state, which is accessible by management module 736, and one or more other modules of control card module 730.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch and a method that facilitate fast convergence to a switch. In one embodiment, the switch includes a storage device, one or more line cards, and a control card. A respective line card includes one or more ports and forwarding hardware. The control card determines routing and forwarding tables for the switch, and comprises processing circuitry and a management module. The management module manage a tunnel or virtual network at the switch. During operation, the control card determine an event associated with layer-2 operations of the switch. The control card refrains from notifying the management module regarding the event and notifies a first line card in the one or more line cards regarding the event. The first line card then updates a layer-3 forwarding entry in the corresponding forwarding hardware based on the notification.

In another embodiment, the switch includes a storage device, one or more line cards, and a control card. A respective line card includes one or more ports and forwarding hardware. The control card determines routing and forwarding tables for the switch, and comprises processing circuitry, a management module, and a multi-destination module. The management module manages one or more tunnels or virtual networks at the switch. The multi-destination module configures layer-3 forwarding entries for multi-destination traffic in the forwarding hardware of the one or more line cards. During operation, the management module determines an event associated with layer-3 operations of the switch and sends a probe message to the multi-destination module to determine whether the multi-destination module is available. If the management module receives a probe response message from the multi-destination module, the management module sends, to the multi-destination module, a notification message comprising information associated with a first tunnel or virtual network affected by the event.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
    one or more line cards, wherein a respective line card includes one or more ports and forwarding hardware;
    a control card for determining routing and forwarding tables for the switch, wherein the control card comprises processing circuitry and a management module configured to manage a tunnel or virtual network at the switch;
    wherein the control card is configured to:
        determine a layer-2 event associated with layer-2 operations of the switch;
        refrain from notifying the management module regarding the layer-2 event associated with the layer-2 operations of the switch; and
        notify a first line card in the one or more line cards regarding the layer-2 event; and
    wherein the first line card is configured to update a layer-3 forwarding entry in the corresponding forwarding hardware based on the notification.

2. The switch of claim 1, wherein the control card is configured to determine the layer-2 event by:
    determining an unavailability of a first port of the switch;
    obtaining an Address Resolution Protocol (ARP) response via a second port of the switch; and
    associating the second port with a mapping between an Internet Protocol (IP) address and a media access control (MAC) address obtained from the ARP response.

3. The switch of claim 1, wherein the layer-3 forwarding entry is associated with a layer-3 next-hop switch for a remote tunnel endpoint of a tunnel affected by the layer-2 event.

4. The switch of claim 3, wherein the layer-3 forwarding entry corresponds to an outer layer-2 header associated with the layer-3 next-hop switch.

5. The switch of claim 1, wherein the control card further comprises a multi-destination module configured to:
    register to receive information of the layer-2 event; and
    update a second layer-3 forwarding entry for multi-destination traffic in the forwarding hardware of the first line card.

6. The switch of claim 5, wherein the multi-destination module is further configured to maintain a list of tunnels and virtual networks of the switch, wherein the list indicates a mapping between a tunnel or virtual network to a corresponding line card.

7. The switch of claim 6, wherein the multi-destination module is further configured to identify a tunnel or virtual network, which is associated with the first line card and affected by the layer-2 event, from the list, wherein the second layer-3 forwarding entry corresponds to the identified tunnel or virtual network.

8. A switch, comprising:
    one or more line cards, wherein a respective line card includes one or more ports and forwarding hardware;
    a control card for determining routing and forwarding tables for the switch, wherein the control card comprises processing circuitry, a management module, and a multi-destination module;
    wherein the multi-destination module is configured to configure layer-3 forwarding entries for multi-destination traffic in the forwarding hardware of the one or more line cards; and
    wherein the management module is configured to:
        manage one or more tunnels or virtual networks at the switch;
        determine an event associated with layer-3 operations of the switch;
        send a probe message to the multi-destination module to determine whether the multi-destination module is available, wherein the management module refrains from sending another probe message when a layer-2 event associated with layer-2 operations of the switch is detected; and
        in response to receiving a probe response message from the multi-destination module, send to the multi-destination module a notification message comprising information associated with a first tunnel or virtual network affected by the event.

9. The switch of claim 8, wherein the management module is further configured to, in response to not receiving a probe response message within a period of time, determine a state for the first tunnel or virtual network, wherein the state indicates that an update in a forwarding entry is needed for the first tunnel or virtual network.

10. The switch of claim 9, wherein, in response to receiving the probe response message, the management module is further configured to:
    identify the state for the first tunnel or virtual network; and insert information associated with first the tunnel or virtual network into a buffer.

11. The switch of claim 10, wherein, in response to the buffer reaching a threshold, the management module is further configured to include the information of the buffer in the notification message.

12. The switch of claim 8, wherein the management module is further configured to maintain a list of the one or more tunnels or virtual networks managed by the management module, wherein the list includes an entry for the first tunnel or virtual network.

13. The switch of claim 8, wherein, in response to detecting an unsuccessful transmission of the notification message, the management module is further configured to send a second probe message to the multi-destination module to determine whether the multi-destination module is available.

14. The switch of claim 8, wherein whether the multi-destination module is available is determined based on a global state maintained for the multi-destination module, wherein the global state is accessible by the management module and a second module of the control card.

15. A method, comprising:
   determining, by a control card of a switch, a layer-2 event associated with layer-2 operations of the switch, wherein the control card is configured to determine routing and forwarding tables for the switch, and wherein the control card comprises a management module, which manages a tunnel or virtual network at the switch;
   refrain, by the control card, from notifying the management module regarding the layer-2 event associated with the layer-2 operations of the switch while notifying the management module regarding another event associated with layer-3 operations of the switch;
   notifying, by the control card, first line card regarding the layer-2 event, wherein the first line card includes one or more ports and forwarding hardware; and
   updating, by the first line card, a layer-3 forwarding entry in the corresponding forwarding hardware based on the notification.

16. The method of claim 15, wherein determining, by the control card, the layer-2 event comprises:
   determining an unavailability of a first port of the switch;
   obtaining an Address Resolution Protocol (ARP) response via a second port of the switch; and
   associating the second port with a mapping between an Internet Protocol (IP) address and a media access control (MAC) address obtained from the ARP response.

17. The method of claim 15, wherein the layer-3 forwarding entry is associated with a layer-3 next-hop switch for a remote tunnel endpoint of a tunnel affected by the layer-2 event, and wherein the layer-3 forwarding entry corresponds to an outer layer-2 header associated with the layer-3 next-hop switch.

18. The method of claim 15, further comprising: registering, by the control card, to receive information of the layer-2 event; and updating, by the control card, a second layer-3 forwarding entry for multi-destination traffic in the forwarding hardware of the first line card.

19. A method, comprising:
   configuring, by a multi-destination module of a control card of a switch, a layer-3 forwarding entry for multi-destination traffic in forwarding hardware of a line card of the switch;
      wherein the line card includes one or more ports and forwarding hardware;
      wherein the control card is configured to determine routing and forwarding tables for the switch and comprises processing circuitry, a management module, and the multi-destination module; and
      wherein the management module is configured to manage one or more tunnels or virtual networks at the switch;
   determining, by the management module, an event associated with layer-3 operations of the switch;
   sending, by the management module, a probe message to the multi-destination module to determine whether the multi-destination module is available, wherein the management module refrains from sending another probe message when a layer-2 event associated with layer-2 operations of the switch is detected; and
   in response to receiving a probe response message from the multi-destination module, sending, by the management module, to the multi-destination module a notification message comprising information associated with a first tunnel or virtual network affected by the event.

20. The method of claim 19, further comprising in response to not receiving a probe response message within a period of time, determining, by the management module, a state for the first tunnel or virtual network, wherein the state indicates that an update in a forwarding entry is needed for the first tunnel or virtual network.

21. The method of claim 20, further comprising:
   in response to receiving the probe response message, inserting, by the management module, information associated with the first tunnel or virtual network into a buffer; and
   in response to the buffer reaching a threshold, including, by the management module, the information of the buffer in the notification message.

* * * * *